Feb. 16, 1971  E. O. ROGGENSTEIN ET AL  3,563,097
CONVERSION OF HANDWRITING INTO ELECTRICAL SIGNALS
Filed Nov. 6, 1968  3 Sheets-Sheet 1
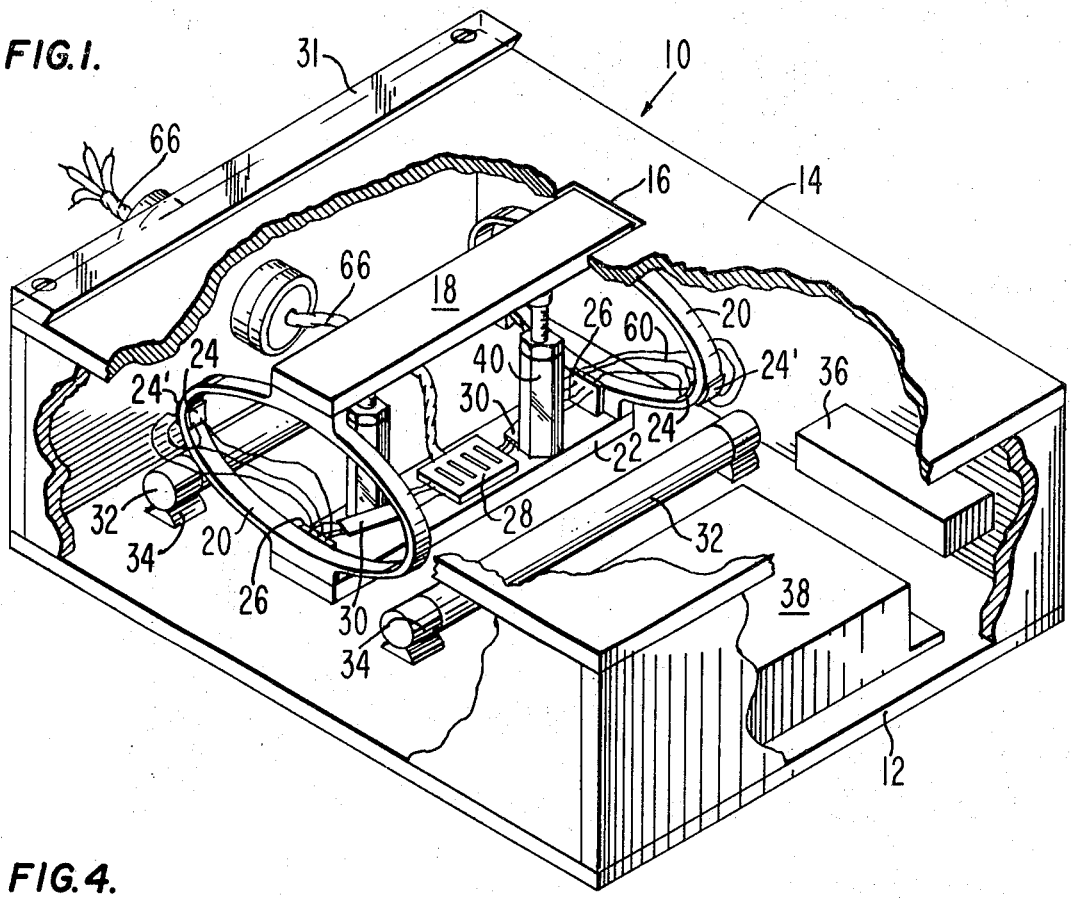
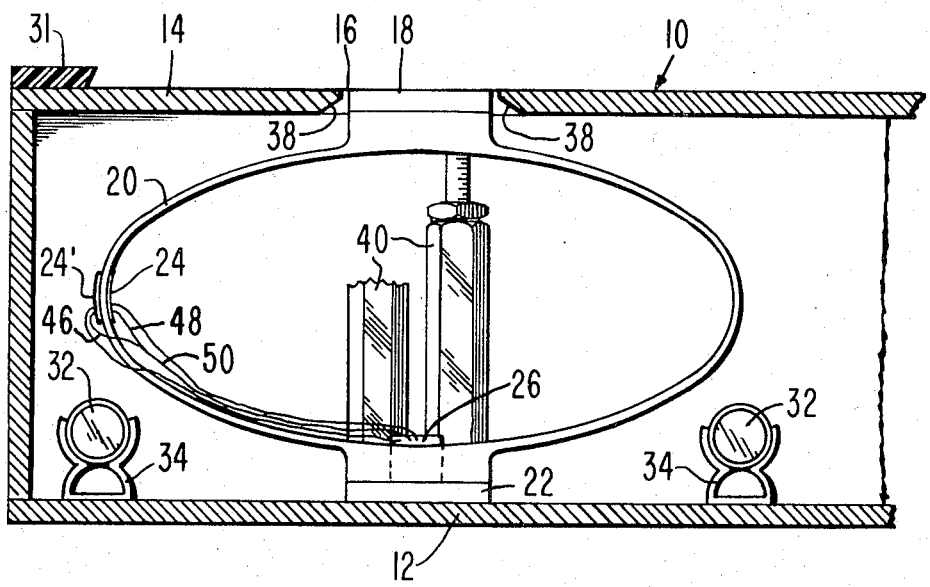
INVENTORS.
EDWIN O. ROGGENSTEIN.
NALLICHERI T. VISWANATHAN.
BY Ralzemond B. Parker
ATTORNEY

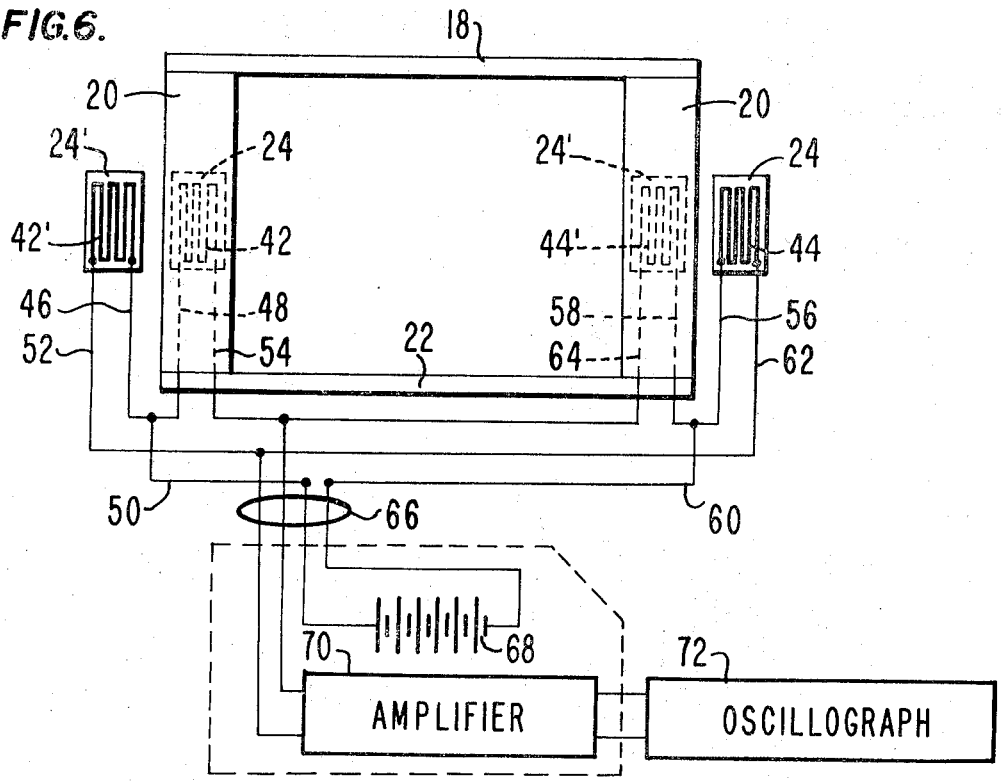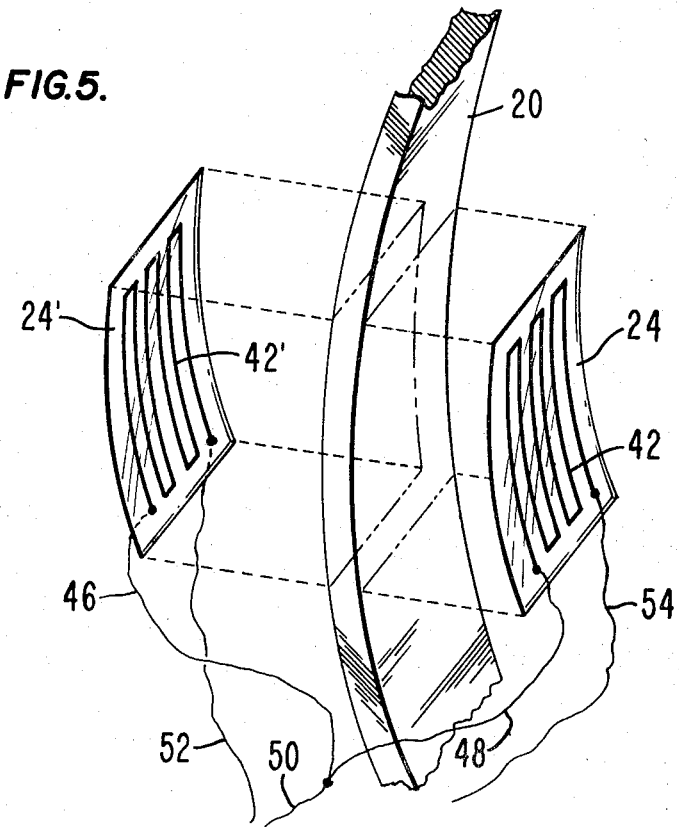

United States Patent Office

3,563,097
Patented Feb. 16, 1971

3,563,097
CONVERSION OF HANDWRITING INTO ELECTRICAL SIGNALS
Edwin O. Roggenstein, Birmingham, and Nallicheri T. Viswanathan, Plymouth, Mich., assignors to Burroughs Corporation, a corporation of Michigan
Filed Nov. 6, 1968, Ser. No. 773,896
Int. Cl. G01l 5/00
U.S. Cl. 73—432
20 Claims

ABSTRACT OF THE DISCLOSURE

Apparatus for converting the act of handwriting to electrical signals and particularly to apparatus having a tablelike provision for yielding to the pressures exerted by a writing implement, such as during the writing of a signature, for transducing such pressures into electrical waveforms which may be recorded or illustrated for comparison and identification purposes. The apparatus employs a handwriting surface elastically yieldingly supported by a pair of elliptically-shaped members disposed in spaced apart parallel planes and further employs electrical strain gages operatively associated with the supporting members for sensing the strains to which the members are subjected during the handwriting procedure and for generating electrical signals indicative thereof.

CROSS REFERENCE TO RELATED PATENT DOCUMENTS

This invention relates to and is useful in a writing classification or identification system of the character disclosed and claimed in the copending application of Johnson et al. Ser. No. 739,803, filed June 25, 1968, which is of common ownership herewith.

BACKGROUND OF THE INVENTION

As is known in this art, it is often desirable to convert handwriting and the like into electrical signal patterns and waveforms for purposes of analyzing the characteristics of the handwritten matter or for forming electrical signals suitable for transmission, for example, in telephone telewriting systems. A variety of electrical transducers have been developed for converting handwriting pressures and the like to signals which can be analyzed or compared with similarly generated signals. Included in such art are writing implements capable of generating electrical signals in response to the pressures exerted thereby during the writing operation. One prior art device of which applicants are aware employs a pressure responsive table upon which the handwriting is performed and involves the pneumatic integration of the forces or pressures exerted between a stylus and a pressure responsive writing surface. Such device employs a gimbaled writing table cooperable with pressure-actuatable valves for charging or discharging a fluid pressure chamber in accordance with the forces exerted during the use of a special air aspirating writing stylus. Pneumatic integrating systems of this type have not found widespread use primarily because of their cost, bulk, complexity and the likelihood of frequent breakdown.

It is therefore an object of the present invention to provide an improved pressure responsive writing surface capable of converting handwriting and the like into electrical signal patterns or waveforms.

It is another object of the present invention to provide an improved mechanism for accurate automated comparison or classification of signatures which is highly sensitive to very minute variations in pressure for generating electrical signals indicative of such variations.

It is also a further object of the present invention to provide an economical unit operable to generate electrical signal patterns in response to handwriting pressures which is composed of few parts, lightweight, portable and capable of rugged usage.

The above objects and other meritorius aspects of applicants' invention are achieved in accordance with preferred embodiments thereof by incorporating a force-responsive transducer in conjunction with a movably mounted support member which provides the surface upon which the writing implement is used. As the writing implement is moved in contact with the writing surface of the table in the course of applying a signature or other handwritten matter thereto, the varying forces exerted by the implement on the writing surface cause the latter to yield slightly in response thereto. Through the provision of highly sensitive electrical transducers, electrical signals are generated proportional in amplitude and duration to the varying applied forces of the handwriting implement.

More specifically, a preferred unit embodying the invention provides a tablelike support serving as a hand rest and a tablet portion separately supported in flush relation with the table upon which the handwritten signatures are written. The writing tablet is supported on an electrical transducer composed of supporting elements, for example, formed of metal as hereinafter described, having a relatively low elastic modulus sufficient to yield to handwriting pressures and of interconnected electrical strain gages mounted on these elements and operable to generate electrical signal patterns representative of the varying writing pressures. The supporting elements for the signature receiving tablet of the unit are each similarly elliptically shaped with minor axis sides thereof mounting the tablet in substantially flush relation with the table and with the major axis sides thereof having the strain gages attached thereto. The unit is preferably light-tight and contains a light source arranged to illuminate the tablet's boundaries for facilitating the signature writing, the nature of the light being such that it will penetrate up to several layers of writing material overlaid upon the tablet.

BRIEF DESCRIPTION OF THE DRAWINGS

The invention and the previous mentioned and other features thereof will be understood more fully and completely from the following detail description considered with reference to the accompanying drawings wherein:

FIG. 1 is a perspective view of a housing unit incorporating the invention and partly broken away to expose the interior construction;

FIG. 4 is a side elevation of one of the elliptical transducer elements of the device taken along the line 4—4 of FIG. 3;

FIG. 5 is enlerged exploded perspective view of a pair of the electrical strain gages showing a preferred manner of mounting on a tablet supporting member; and FIG. 6 is a schematic representation of an electrical circuit utilizable in a preferred embodiment of the invention for generating and recording electrical waveforms in accordance with the principles of the invention.

DETAILED DESCRIPTION OF THE INVENTION

Figure 2:
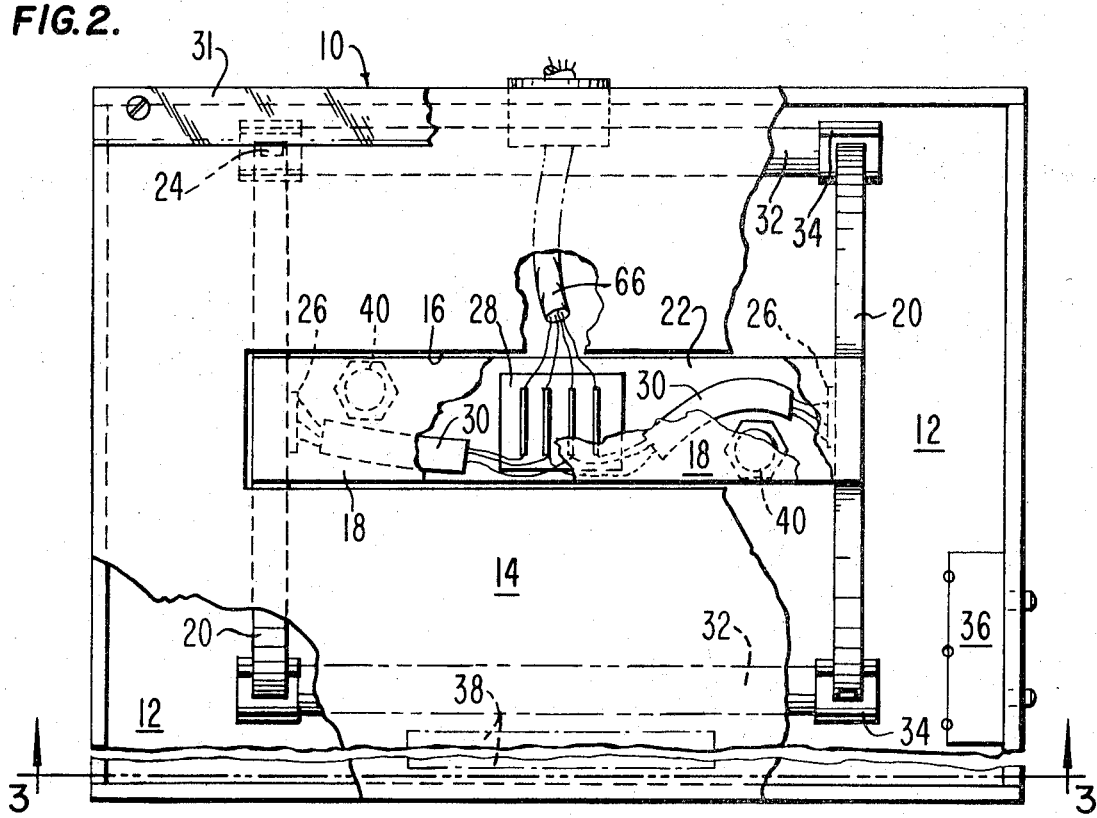
FIG. 2 is a top plan view of the housing unit of FIG. 1 showing in dotted outline and broken away sections the layout of the operating components.
Figure 3:
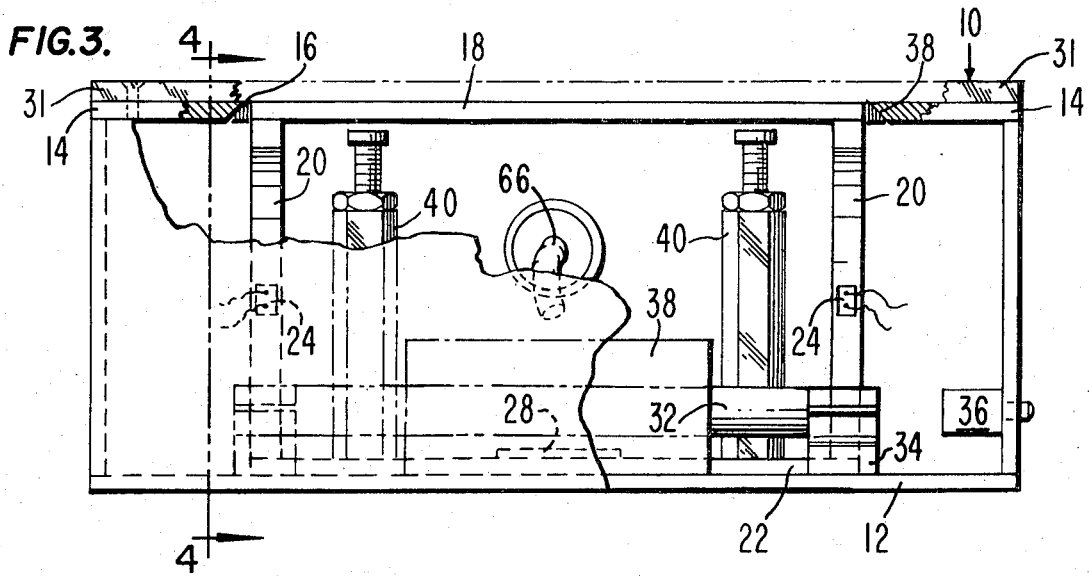
FIG. 3 is a vertical cross sectional view taken along line 3—3 of FIG. 2 and showing the interior construction of the device.

Referring now to FIGS. 1, 2, and 3 there is shown a personal identification verifying apparatus employing the principles of this invention for determining whether or not a person is the authorized holder of an identification card or the like. The apparatus includes an exterior housing generally indicated at 10 and in general taking a rectangular form including a bottom wall 12, top wall 14 and opposite side walls. The top wall 14 is provided with an opening 16 generally centrally thereof which for the purpose of verifying signatures is of a size to accommodate an ordinarily written signature. Positioned within the opening 16 and normally extending flush with the top wall 14 is a writing tablet 18 presenting a supporting surface upon which a signature may be written. In writing this signature, the heel of the hand holding the writing implement would be rested on the upper wall 14 and only the end of the implement would bear upon the tablet.

The writing surface or tablet 18 is yieldably maintained within the opening 16 in substantially flush relation to the upper wall 14 so that the tablet may move limited distances both downwardly and horizontally in response to the forces exerted by the writing implement. The support for the tablet 18 constitutes an important part of this invention and is herein shown as a pair of similar closed loop members 20—20 exhibiting a general ring-shaped configuration which are disposed in opposed relation to one another in spaced apart parallel planes. The tablet supporting members of the illustrated embodiment of the invention fit between the upper and lower walls 12 and 14 and substantially occupying the vertical distance therebetween.

Referring more specifically to FIGS. 1, 2, and 3, it will be noted that the tablet 18 assumes the function of a cross member bridging the space between the supporting members 20—20 and mounted in load transmitting relation to the upper side of these members. A similar cross member 22 bridges the space between the members 20—20 and is secured to the lower sides thereof as best shown in FIGS. 1 and 3. The two supporting members 20—20 and the top and bottom cross members 18 and 22 form a unitary assembly received within the housing and are so dimensionally related to the housing that the upper cross member 18, constituting the writing surface, lies within the rectangular opening 16 substantially flush with the top wall 14.

To obtain the desired elasticity so that the tablet may respond resistingly to the handwriting pressures applied thereto, it is preferred that the supporting members 20—20 assume an oval and preferably a true eliptical formation as shown in FIG. 4. In the illustrated embodiment of the invention, the long or major axis of the elliptical formation of each supporting member is approximately twice the shorter or minor axis thereof. These dimensions may be varied depending upon the elasticity of the material of which these members are composed. So mounted, the tablet 18 has a limited movement both vertically and horizontally for the pressure intended.

A preferred material for the elliptical supporting members is aluminum of which suitable commercial designated types as 14S–T6 and 24S–T36 having a modulus of elasticity of $10.6 \times 10^6$ p.s.i. are suitable. Each aluminum member 20 may be cast in the configration illustrated thus providing an unintterrupted solid ring of homogeneous material for each elastic support. Other suitable materials for these supports include yellow brass, SAE–41 with a modulus of elasticity of $12.8 \times 10^6$ p.s.i., magnesium alloy AZ31X, with a modulus of elasticity of $6.5 \times 10^6$ and Muntz metal with a modulus of elasticity of $12.8 \times 10^6$ p.s.i. Materials of this character will resiliently yield to the writing pressures imposed on the tablet 18, but in actuality their respective resistances to change in shape are so great that the maximum extent of their yield under such circumstances is not noticeable to the writer.

Referring to the accompanying figures, electrical strain gages, a pair of which are enlarged in FIG. 5 and identified at 24 and 24', are bonded or otherwise mounted upon each elliptical member 20 and preferably at an optimum point thereof where tension and compression are at a maximum for its elliptical shape. As is evident from FIGS. 1 and 4, such preferred position is along a major axis side of each elliptical member 20—20. Preferably also, each strain gage is of the conventional electrical resistance foil type incorporated in a thin wafer or film of electrically insulating material such as epoxy resin and bonded to the surface of each elliptical member. Moreover, as shown in FIGS. 4 and 5, each complementary set of strain gages 24 and 24' is preferably mounted on the opposite sides of an apogean section of each elliptical ring at the point of intersection of the major axis therewith.

With particular reference to FIGS. 1 and 4, an electrical treminal 26 is mounted on the lower inner side of each elliptical ring 20. Extending from the complementary pair of strain gages carried by each elliptical ring are electrical leads, herein later more particularly identified, which run to the terminal 26 at the bottom of the ring. Centrally located on the bottom cross member 22 of the tablet supporting system is a main terminal 28. Extending longitudinally of this cross member are flat cables 30—30, each serving to connect one of the ring supporting terminals 26 to the main terminal. As more particularly described in connection with FIG. 6, the main terminal 28 connects the strain gage grids with certain electrical components external of the unit 10 into a Wheatstone-bridge circuit.

Means are provided for outlining the tablet 18 so that the user is made aware of the area into which to perform the writing requested, such as his signature. Usually, writing paper, such as a bank check or other document, is overlaid upon the supporting surface 14, assisted by a front edge undercut guide member 31, with the result that the tablet 18 is obscured from view. In the illustrated embodiment of the invention, the outlining of the tablet area is accomplished by illuminating the interior of the unit 10 so that light rays therefrom will pass through the slight clearance between the tablet and the top wall 14 and provide a boundary of light within which the handwriting is performed. In order for the light to penetrate one or more layers of writing paper that may be overlaid upon the tablet's writing surface, it is highly desirable to employ a source of light emitting ultraviolet radiation. Suitable means for this purpose is the conventional fluorescent lighting tube, and two such are shown in the drawings at 32—32 in the bottom area of the unit on opposite sides of the tablet 18. The ends of the tubes are mounted in conventional clips 34 and wiring (not shown) is provided for connecting the tubes to a switch box 36 having operating buttons accessible to the outside of the unit as shown in FIGS. 2 and 3. A conventional starting ballast component for the fluorescent tubes is shown at 38.

It is preferred that the unit be light-tight and to assure sufficient light around the tablet, the side edges of the top wall forming the opening 16, or those of the tablet, may be beveled as shown at 38 in FIG. 4 to assure sufficient illumination in the clearance around the tablet. It has been found that light from the fluorescent tubes, as contrasted with light from incandescent lamps, will penetrate through several sheets of writing paper or even card stock spread over the tablet and has the additional advantage of being cool in operation. The unit may therefore be light-tight and be painted white interiorly for better light reflection and no provision need by made for ventillating the same.

It was earlier mentioned herein that the amount of deflection of the elliptical supporting members 20—20 encountered during the writing of a signature upon the tablet 18 would be so slight as to be unnoticed by the writer. Nevertheless, to prevent the elliptical members from being overstressed by forces substantially greater than normal writing pressures it is desirable to provide stops limiting the amount of downward travel of the tablet 18. Two such limit stops are shown at 40—40 near each end of the tablet. These stops are in the form of posts extending from the bottom cross member 20 to just short of the upper cross member 18 as best shown in FIG. 3. These stops may be adjustable to vary their respective heights, and to this end each may be constructed of two coaxial elements threadedly engaging one another, together with a lock nut for locking the post at the desired height.

FIG. 6 schematically illustrates the Wheatstone-bridge circuit into which the strain gages on the elliptical supports are connected. Reference may be made to the publication: The Strain Gage Primer, by Perry and Lissner, printed by McGraw-Hill Book Company, Inc., for a fuller explanation of the electrical resistance type of strain gage and its employment in a Wheatstone-bridge circuit for strain measurement. Suffice it to say, the strain gages employed in the herein illustrated embodiment of the invention are of the conventional metallic foil type each having a grid configuration mounted on a backing of paper or plastic which serves as a thin flexible carrier for the conductive filaments of the grid as well as to insulate the conductive grid from the metal surface of the elliptical support upon which it is bonded.

The strain gages are mounted on the elliptical supports in the manner shown in FIG. 5 so that a pair of strain gages forming a half bridge of the Wheatstone-bridge circuit are disposed on opposite sides of one bowed section of each support at the intersection of the major axis thereof. The other two strain gages forming the remaining half bridge of the circuit are similarly disposed on opposite sides of one bowed section of the other elliptical support. However, in order to record only the vertical forces encountered in the handwriting act, and thus eliminate consideration of any side thrust on the tablet 18, the pairs of gages are disposed on opposite sides of the tablet as best shown in FIG. 1. By this disposition, the Wheatstone-bridge output for any lateral movement of the tablet 18 will remain at "zero" and only the vertical forces be analyzed and recorded, thus eliminating undesirable variations due to the angular position of the writing implement from signature to signature.

With further reference to FIG. 6, it is understood that the physical disposition of the strain gages on the tablet supporting system is that as previously described herein. The four grid resistances making up the strain gages are identifier at 42 and 42' as one half bridge of the Wheatstone-bridge circuit and at 44 and 44' as the other half bridge of the circuit. One terminal end of each resistance is electrically connected to its companion resistance by a connection to a common lead extending to the associated elliptical support terminal 26. This is illustrated in FIG. 5 where one lead 46 of resistance 42' is joined to one lead 48 of resistance 42 to form a common lead 50 which then extends through associated terminal 26 to the main terminal 28. The remaining terminals of the two resistances 42 and 42' have their respective leads 52 and 54 extending separately through terminal 26 to the main terminal 28. In this manner the four leads from the two grid resistances 44 and 44' on the other tablet support extend to the main terminal, leads 56 and 58 joining to form a common lead 60 and leads 62 and 64 extending separately to the main terminal. The separate lead 52 from one elliptical support makes common junction with the separate lead 62 of the other support at the main terminal 28 and similarly the separate leads 54 and 64 from the two elliptical supports make common juncture in the main terminal. A cable 66 may then be used to conduct the separate conductors from the four outlets of the main terminal thus extending the leads from the two pairs of strain gages to the exterior of the unit 10 as shown in FIG. 1.

The Wheatstone-bridge circuit is completed externally of the unit 10 by means of a source of electrical energy, as respresented by the battery 68, and an amplifier 70 both shown as in FIG. 6 as enclosed within a dotted outline which is representative of a conventional unit containing these two components. The terminals of the battery 68 are connected respectively through the main terminal 28 to the common leads 50 and 60. The amplifier is connected through the main terminal 28 to the common junctures of the leads 52 and 62 and of the leads 54 and 64. With these components and connections the Wheatstone-bridge circuit is completed. The output of the amplifier may be connected to a utilization device for recording, analyzing or comparing the waveforms generated by the pressures to which the tablet 18 is subjected. A conventional oscillograph, such as identified at 72 in FIG. 6 may serve this purpose, but it is understood that the electrical signals generated by the strain gages may be amplified, if warranted, and connected to some other form of utilization device.

The strain gages are illustrated herein as arranged in pairs with each pair on the opposite sides of the same bowed section of a tablet support 20. However, a pair of such strain gages making up a half bridge of the Wheatstone-bridge circuit may be mounted on an elliptical support 20 so that one gage is bonded to the exterior side of one bowed section of the support while the other gage is bonded to the interior side of the opposite bowed section of the same support. Furthermore, if desired, four pairs of strain gages may be employed on the two elliptical supports 20—20, one pair being mounted on the opposite sides of each apogean portion of the supports. These four pairs of strain gages would be connected into a Wheatstone-bridge circuit and so that horizontal forces encountered by the tablet 18 in the handwriting act are nullified leaving only the vertical forces for recording and analysis.

In the illustrated embodiment of the invention, the cross member 18 forming the writing surface is located at the top of the elastic system and the writing forces which are sensed are directed downwardly and inwardly of the elliptical supporting members 20—20. It would be within the scope of the invention to invert the system so that it is suspended from an overhead support and locating the cross member 18 providing the writing surface at the bottom of the assembly. In this arrangement, the writing pressures would be applied to the reverse side of the cross member and downwardly and outwardly of the elliptical member 20—20. In such an inverted arrangement the strain gages would function in a manner similar to that described herein to provide an electrical waveform representative of the writing pressures.

While a particular embodiment of the invention has been shown and described, it will be understood, of course, that it is not desired that the invention be limited thereto since modifications may be made, and it is, therefore, contemplated by the appended claims to cover any such modifications as fall within the spirit and scope of the invention.

What is claimed is:

1. Personal identification verifier apparatus for determining if a person is the authorized holder of an identification card or the like, comprising:

a housing providing at table portion having an opening therethrough of a size to encompass the normally written signature, a table exposed in the opening of the table portion and serving as a writing surface upon which signatures are written, relatively rigid elastic means supporting the tablet in the opening of the table portion characterized as having a modulus of elasticity such that its yielding responses to handwriting pressures imposed on the tablet are imperceptible to the writer, and electrical strain gage means in operative engagement with said elastic supporting means and flexing in response to changes in strain to which the supporting means is subjected during the writing of signatures on the tablet for causing the generation of electrical signals indicative thereof.

2. The apparatus defined in claim 1 wherein the elastic means is characterized as a pair of elastically yieldable bowed-shaped members mounted within the housing in spaced apart vertical planes below the tablet and supporting the tablet in bridging relation thereto.

3. The apparatus defined in claim 1 wherein a light source is associated with the housing and arranged to illuminate the area of the tablet.

4. Apparatus for converting the act of handwriting to electrical strain gage means operatively mounted on a pair of similarly shaped supporting members arranged in spacedapart parallel planes and each having a similar degree of elastic flexibility sufficient to yield to handwriting pressures, a cross member bridging the space between the pair of supporting members and assembled in load transmitting relation upon corresponding portions of the supporting members, said cross member providing a surface intermediate the supporting members upon which handwriting is to be performed, and electrical strain gage means operatively mounted on the supporting members, said strain gage means responding to said strain occurring in the supporting members when handwriting pressures are imposed on the cross member and being operable to generate electrical signals indicative thereof.

5. The invention described in claim 4 characterized in that the supporting members are elliptical in formation and that the cross member is assembled in load transmitting relation upon a corresponding minor axis side of each elliptical member.

6. The invention described in claim 5 characterized in that the electrical strain gage means is composed of separate elements bonded to a major axis side of each of the elliptical supporting members.

7. Apparatus for converting the act of handwriting into electrical signals comprising, in combination:

a pair of elliptically shaped flexible supporting members of like proportions arranged in opposed relation to one another in parallel spaced apart vertical planes and each having a similar degree of elasticity to yield to handwriting pressures, a cross member bridging the space between the pair of electrical members and secured at its opposite ends to a corresponding minor axis side of each elliptical member, said cross member having a portion thereof serving as a supporting surface for handwriting purposes, a second cross member similarly bridging the space between the pair of elliptical members and secured at its opposite ends to the other minor axis side of each elliptical member, said second cross member having electrical terminals positioned thereon, and electrical strain gages operatively mounted on the major axis side of the elliptical members and having leads extending therefrom to said terminals, said strain gages responding to changes of stress in the elliptical members occurring when writing pressures are imposed on the supporting surface of the first cross member and being operable to generate electrical signals indicative thereof.

8. Apparatus for converting the act of handwriting into electrical signals comprising, in combination:

a light-tight housing having the top wall thereof provided with an opening therethrough elongated in one dimension and of a size to accommodate normally written signatures, a tablet exposed in the opening of the top wall of the housing and serving as a writing surface upon which signatures are written, said tablet being dimensionally shaped to fit substantially within the opening but with a slight clearance between the edge portions of the top wall forming the opening and the tablet, means supporting the tablet in the opening of the top wall in substantially flush relation with the upper surface thereof and having a modulus of elasticity sufficient to provide a hardly noticeable yield to handwriting pressures imposed on the tablet, electrical strain gage means operatively associated with said tablet supporting means and responding to changes in strain to which the supporting means is subjected during the writing of signatures on the tablet by generating electrical signals indicative thereof, and a source of illumination in the housing from which light rays are derived for passage through said slight clearance between the tablet and the top wall to provide a lighted outline within which to write signatures.

9. The apparatus defined in claim 8 wherein the tablet supporting means is characterized as a pair of elastically yieldable members mounted within the housing below each end section of the tablet and cooperating to support the tablet in the opening of the top wall.

10. The apparatus defined in claim 8 wherein the source of illumination includes ultraviolet light for penetrating writing material overlaid upon the tablet and adjacent portions of the top wall of the housing.

11. Personal identification verifier apparatus for determining if a person is the authorized holder of an identification card or the like comprising, in combination, a tablelike support providing a hand rest for a writer, a tablet positioned adjacent to the tablelike support and serving as a writing surface upon which handwriting pressures are applied, a relatively rigid member supporting the tablet approximately flush with the tablelike support and having a modulus of elasticity such that its yielding response to handwriting pressures imposed on the tablet are imperceptible to the writer, one or more electric strain gage elements in operative engagement with said supporting member and flexing in response to the yield of the supporting member to handwriting pressures received by the tablet, and an electrical circuit connected to said one or more strain gage elements and operable to generate electrical signals indicative of the changes in strain to which the relatively rigid supporting member is subject during handwriting on the tablet.

12. The apparatus as set forth in claim 11 wherein a light source is located below the tablelike support and arranged to illuminate the area of the tablet.

13. The apparatus as set forth in claim 11 wherein the electric circuit is constituted by a Wheatstone-bridge circuit of which the strain gage elements form electrically resistive parts thereof.

14. The apparatus as set forth in claim 11 wherein the elastic means is characterized as a pair of elastically yieldable bowed-shaped members mounted in spaced apart vertical planes below the tablet and supporting the tablet in bridging relation thereto.

15. The apparatus as set forth in claim 14 wherein strain gage elements are mounted on the bowed shaped members.

16. Apparatus for converting the act of handwriting to electrical signals comprising, in combination:

a pair of similarly shaped relatively rigid supporting members arranged in spaced apart relation and each having a similar degree of elastic flexibility such as to yield imperceptibility to handwriting pressures, a tablelike member bridging the space between the pair of supporting members and assembled in load transmitting relation upon corresponding portions of the supporting members, said table member providing a surface upon which handwriting is to be performed, electric strain gages mounted on the supporting members and flexing in response to strain occurring in the supporting members when handwriting pressures are imposed on the table member, and an electrical circuit of the Wheatstone-bridge type connected to said strain gages such that the gages form electrically resistive portions thereof, said circuit being operable to generate electrical signals indicative of the changes in strain to which the gages are subjected as the supporting members imperceptibly yield to handwriting pressures.

17. The invention described in claim 16 characterized in that the supporting members are generally elliptical in formation and that the tablelike member is assembled in load transmitting relation upon a corresponding minor axis side of each elliptical member.

18. The invention described in claim 17 characterized in that each electrical strain gage is an electrically conductive element insulatively bonded to a major axis side of each of the elliptical supporting members.

19. Apparatus for coinverting the act of handwriting into electrical signals comprising, in combination:
a generally light-tight housing having the top wall thereof provided with an opening therethrough,
a tablet positioned within the opening of the top wall of the housing and serving as a writing surface upon which handwriting pressures are applied, said tablet being dimensionally shaped to fit substantially within the opening but with slight clearances between the edge portions of the top wall forming of the opening and the tablet,
means supporting the tablet in the opening of the top wall in substantially flush relation with the upper surface thereof and having a modulus of elasticity sufficient to yield to handwriting pressures imposed on the tablet,
electrical means within the housing operatively associated with said tablet supporting means and indicating the handwriting pressures impressed on the tablet by generating electrical signals indicative thereof, and
a source of illumination within the housing from which light rays are derived for passage through said slight clearances between the tablet and the top wall to provide a lighted outline signifying the boundary of the tablet.

20. The apparatus as set forth in claim 19 wherein the source of illumination includes ultraviolet light.

References Cited

UNITED STATES PATENTS

| | | | |
|---|---|---|---|
| 2,564,416 | 8/1951 | Wildhack | 73—141 |
| 2,582,886 | 1/1952 | Ruge | 73—141 |
| 2,091,060 | 8/1937 | Watson | 33—18B |
| 2,499,033 | 2/1950 | Oberholter | 73—141(A) |
| 3,113,461 | 12/1963 | Peters | 73—432 |
| 3,240,065 | 3/1966 | Taber | 73—141 |

S. CLEMENT SWISHER, Primary Examiner

U.S. Cl. X.R.

35—1; 73—141

PO-1050
(5/69)

UNITED STATES PATENT OFFICE
CERTIFICATE OF CORRECTION

Patent No. 3,563,097            Dated February 16, 1971

Inventor(s) Edwin O. Roggenstein and Nallicheri T. Viswanatha

It is certified that error appears in the above-identified patent and that said Letters Patent are hereby corrected as shown below:

Col. 2, line 27, after "metal" insert a comma --,--.

Col. 2, line 61, correct spelling of "enlarged".

Col. 3, line 21, correct spelling of "tablet".

Col. 3, line 47, correct spelling of "elliptical".

Col. 3, line 60, correct spelling of "configuration".

Col. 3, line 61, correct spelling of "uninterrupted".

Col. 4, line 14, correct spelling of "terminal".

Col. 5, line 62, change "junction" to --juncture--.

Col. 6, line 54, after "the" and before "spirit" insert --tr

Col. 6, line 60, change "at" to --a--.

Col. 7, line 12, delete the entire line and substitute in lieu thereof --electrical signals comprising, in combination:--.

Col. 7, line 14, change "spacedapart" to --spaced apart--.

Cpl. 8, lines 59 and 60, after "wherein" and before "strain" insert

Col. 8, line 68, correct spelling of "imperceptibly".

Col. 9, line 19, correct spelling of "converting".

Col. 9, line 28, delete "of", (second occurrence).

Signed and sealed this 15th day of June 1971.

(SEAL)
Attest:

EDWARD M. FLETCHER. JR.            WILLIAM E. SCHUYLER, JR.